US010189208B2

United States Patent
Kolobaric et al.

(10) Patent No.: US 10,189,208 B2
(45) Date of Patent: Jan. 29, 2019

(54) HEADLAMP TRANSPORT DEVICE

(71) Applicant: HBPO GmbH, Lippstadt (DE)

(72) Inventors: Dragan Kolobaric, Windsor (CA); Michal Labas, Rochester, MI (US); Matthew Weber, Lapeer, MI (US)

(73) Assignee: HBPO GmbH, Lippstadt (DE)

( * ) Notice: Subject to any disclaimer, the term of this patent is extended or adjusted under 35 U.S.C. 154(b) by 188 days.

(21) Appl. No.: 15/238,822

(22) Filed: Aug. 17, 2016

(65) Prior Publication Data

US 2017/0051890 A1 Feb. 23, 2017

(30) Foreign Application Priority Data

Aug. 19, 2015 (DE) .......................... 10 2015 010 895

(51) Int. Cl.
*B60J 7/00* (2006.01)
*B29C 65/78* (2006.01)
*B60Q 1/04* (2006.01)
*B62D 25/08* (2006.01)

(52) U.S. Cl.
CPC ........ *B29C 65/7855* (2013.01); *B60Q 1/0475* (2013.01); *B62D 25/085* (2013.01)

(58) Field of Classification Search
CPC .............. B29C 65/7855; B60Q 1/0475; B60Q 1/0408; B60Q 1/0483; B60Q 1/0491; B62D 25/085; B62D 29/00; B62D 25/084; B62D 29/001
USPC ................. 296/203.02, 198, 187.09, 187.01; 362/396, 382; 403/14
See application file for complete search history.

(56) References Cited

U.S. PATENT DOCUMENTS

| | | | | |
|---|---|---|---|---|
| 5,288,117 A * | 2/1994 | Vogelgesang | ........ | B60Q 1/0041 293/117 |
| 6,502,974 B2 * | 1/2003 | Chase | .................. | B60Q 1/0041 362/549 |
| 7,607,723 B2 * | 10/2009 | Bierjon | ................ | B62D 25/084 296/203.02 |
| 8,070,335 B2 * | 12/2011 | Becher | ................ | B60Q 1/0441 296/193.09 |
| 8,550,510 B2 * | 10/2013 | Mizoguchi | .............. | B60R 19/24 293/126 |
| 9,073,478 B2 * | 7/2015 | Krajenke | ............. | B60Q 1/0491 |
| 9,550,447 B2 * | 1/2017 | Ahmed | ................ | B60Q 1/0483 |
| 9,718,394 B2 * | 8/2017 | Kawamura | .......... | B60Q 1/0433 |

(Continued)

*Primary Examiner* — Chi Q Nguyen
(74) *Attorney, Agent, or Firm* — Laurence P. Colton; Smith Tempel Blaha LLC (57) ABSTRACT

A motor vehicle front end having one, preferably two, headlamps, wherein the headlamp is intended and constructed so as to be fastened in an assembly position onto the motor vehicle, in particular onto the motor vehicle front end, and wherein the headlamp is fastened by means of a transport holder on the front end in a transport position, the transport position being different from the assembly position. The transport position is offset frontward and/or downward relative to the assembly position, in order to provide a front end, motor vehicle, and method that make it possible to create motor vehicle designs with which pre-assembly of the headlamps in the assembly position thereof is not possible, without thereby incurring additional logistical complexity on the assembly lines for the vehicle, or wherein this additional complexity is at least largely avoided.

16 Claims, 9 Drawing Sheets

(56) References Cited

U.S. PATENT DOCUMENTS

| | | | | |
|---|---|---|---|---|
| 2004/0070986 A1* | 4/2004 | Takahashi | ............ | B60Q 1/0433 |
| | | | | 362/487 |
| 2006/0249987 A1* | 11/2006 | Kroll | .................... | B60Q 1/0441 |
| | | | | 296/193.01 |
| 2010/0073950 A1* | 3/2010 | Kawamura | .......... | B60Q 1/2696 |
| | | | | 362/538 |
| 2013/0258695 A1* | 10/2013 | Yamazaki | ............. | F21S 41/692 |
| | | | | 362/513 |
| 2015/0353002 A1* | 12/2015 | Ahmed | ................ | B60Q 1/0483 |
| | | | | 296/187.09 |

* cited by examiner

HEADLAMP TRANSPORT DEVICE

STATEMENT OF RELATED APPLICATIONS

This application claims the benefit of German Patent Application No. 10 2015 010 895.6 having a filing date of 19 Aug. 2016.

BACKGROUND OF THE INVENTION

Technical Field

The present invention relates to a motor vehicle front end and to a method for assembling a motor vehicle front end.

Prior Art

Motor vehicle front ends of the type in question are, in particular, pre-assembled modules of a motor vehicle that are regularly composed of struts in the height and transverse directions of the motor vehicle, with additional motor vehicle parts accommodated thereof. These additional motor vehicle parts may regularly entail parts of the motor vehicle lighting, radiator, bumpers, and/or shock-absorbing elements, such as, for example, so-called crash boxes, cladding elements, locking elements for the hood, sensors, and the like. For the sake of terminological simplicity, merely the term "front end" is used hereinbelow to refer to motor vehicle front ends.

In the manufacture of modern motor vehicles, it is common for front ends to be prefabricated at different production facilities than the production facilities at which the front ends are assembled onto the rest of the motor vehicle. This is often due to the fact that the front ends are made by suppliers, whereas the front end is assembled onto the rest of the motor vehicle first in the context of the completion of the motor vehicle and thus normally by the manufacturer of the motor vehicle.

Modern motor vehicles are offered in a variety of configurations, in order, for example, to meet national requirements for approval of the motor vehicle or to meet customer needs, which necessitate different equipment features on the motor vehicle. Within the framework of production planning, therefore, the front end is regularly already adapted in the assembly to individual equipment features of the eventual motor vehicle, and thus, in particular, special headlamp types for different markets or different equipment variants are used. If the headlamp is assembled at the earlier stage of the prefabrication of the front end, then this reduces the logistical complexity of finishing the motor vehicle, because this obviates the need to keep different types of headlamps available and to assign the headlamps to the respective motor vehicles.

However, it is not always possible to assemble the headlamp onto the motor vehicle front end before assembly thereof onto the motor vehicle. Often, for design reasons, auto body parts are shaped such that it is not possible for the front end to be connected to the motor vehicle with the headlamps being already present in the assembly position thereof, i.e., the position in which the headlamps are to be assembled in the fabrication of the motor vehicle. In such cases, the front ends are pre-assembled without headlamps, brought to the production facility for the finishing manufacture, and assembled there onto the motor vehicle. The headlamps are then assembled—regularly by hand—in an additional step. Then, the individual headlamps, having been assigned to the respective motor vehicle being fabricated, must be made available on the assembly line. Examples of individual headlamp types that are used include US and EU variants, variants for vehicles with left-hand drive and right-hand drive, and variants with different light sources, such as halogen headlamps, xenon headlamps, and/or LED head lamps. Providing individual headlamps on the assembly line and ensuring that the correct headlamps are assembled onto the correct motor vehicle results in an undesirable logistical complexity.

BRIEF SUMMARY OF THE INVENTION

The present invention therefore addresses the problem of providing a front end, motor vehicle, and method for assembling a front end that make it possible to create motor vehicle designs with which pre-assembly of the headlamps in the assembly position thereof is not possible, without thereby incurring additional logistical complexity on the assembly lines for the vehicle, or wherein this additional complexity is at least largely avoided.

The problem is solved by a front end, motor vehicle, and method for assembling a front end with the features of the independent claims. The features of the dependent claims pertain to advantageous embodiments.

According to the present invention, the motor vehicle front end comprises at least one, preferably two headlamps. For the sake of simplicity, all features and advantages are described hereinbelow with reference to one headlamp. Said features and advantages, however, apply equally to all headlamps of the motor vehicle.

The headlamps of a front end according to the present invention are designed to be fastened onto the motor vehicle in an assembly position. The assembly position is to be understood here to be the position in which the headlamp is assembled onto the completed motor vehicle. The present invention now provides for fastening this headlamp onto the front end by means of a transport holder in a transport position that is different from the assembly position.

This makes it possible for the headlamps to be assigned to the motor vehicle as early as the pre-assembly of the motor vehicle front end, and to be connected thereto in such a manner that a more secure connection between the headlamp and the front end enables common transport of the pre-assembled module thus formed. The transport holder may entail, for example, a plastic part. In this context, plastic parts are advantageous in having a favorable weight/stability ratio and in being possible to manufacture in almost any shape.

The transport position is selected such that when in the transport position, the headlamp is at a position in which the headlamp does not hinder the assembly of the front end onto the motor vehicle by colliding with a part of the motor vehicle. For example, striking against a region of a fender that would collide with a headlamp located in the assembly position thereof if the front end is being moved or slid onto/into the auto body of the motor vehicle in the longitudinal direction of the vehicle. In this context, it is advantageous for the transport position to be offset frontward and/or downward relative to the assembly position. During assembly of the front end, the frontward offsetting makes it possible to avoid collisions with auto body parts that overlap the motor vehicle headlamp or are undercut thereby when seen in the direction of travel. Downward displacement of the transport position relative to the assembly position prevents, in particular, pertinent collisions in the region of the upper side of the headlamp, which is of particular importance because it is precisely here that elements such as the fender often overlap a part of the headlamp.

Preferably, the transport holder has a first locking element for producing a releasable positive-locking connection of the transport holder to the headlamp. Such a locking element, which preferably has an operating element, makes it possible to have a rapid and producible connection between a transport holder and the headlamp. Thus, releasing the locking element allows for the headlamp to also be especially easily released from the transport holder, the operating element preferably being designed so as to enable a manual operation, the operating element being in particular designed and arranged on the transport holder so as to enable unlocking even when the front end has already been assembled.

Preferably, the transport holder has a second locking element for producing a releasable positive-locking connection of the transport holder to the motor vehicle front end. Such a locking element enables not only simple fastening of the transport holder onto the front end, but also enables especially easy removal of the transport holder, in particular, after assembly of the headlamp. The second locking element, too, preferably has an operating element, wherein the operating element is preferably designed so as to enable unlocking of the operating element in order to remove the transport holder even when the headlamp has already been assembled into the assembly position thereof.

The present invention is particularly useful for motor vehicles in which an auto body element is designed so as to cover a portion of the headlamp as viewed from the front in the longitudinal direction of the motor vehicle. This auto body element preferably entails a fender. Such coverage is a commonly desirable design element of a motor vehicle, which typically leads to it being impossible to pre-assemble the headlamps with the front end in conventional motor vehicles.

According to the method according to the present invention, then, first the motor vehicle front end is pre-assembled at a first production facility. A motor vehicle headlamp is then fastened with a transport holder in a transport position onto the motor vehicle front end. Next, the motor vehicle front end is transported to a second production facility. In this context, the method according to the present invention is especially advantageous if both production facilities are at a significant distance from one another, i.e., if at least these are spatially separated premises.

At the second production facility, the motor vehicle front end is assembled onto the motor vehicle, at which time the headlamp is brought from the transport position into the intended assembly position, and the transport holder is removed and transported back to the first production facility and reused there. The result is a material cycle for the transport holder, whereby relatively low costs for the transport holders occur and also no waste parts are produced.

With this method—as also with the front end according to the present invention—the transport position of the headlamp is located in the immediate spatial vicinity of the assembly position thereof. In particular, the headlamp must be moved at most a distance of 30 cm, in particular, at most 15 cm into the assembly position thereof. Such accommodation of the headlamp in the transport position in a close spatial relation to the assembly position thereof makes it possible to assemble the headlamp in the assembly position thereof in only a few simple steps. The assembly, which is preferably performed by hand, is simplified thereby.

Preferably, when the motor vehicle front end is being assembled onto the motor vehicle, first the front end is fastened onto the motor vehicle, and then the headlamp is released from the motor vehicle front end and fastened onto the motor vehicle in the intended assembly position thereof. This sequence of assembly steps ensures that the headlamp remains in the transport position until the front end has reached the final position relative to the motor vehicle, thus eliminating collisions with any further movements of the front end.

Preferably, when the headlamp is released from the front end, the headlamp is first released from the transport holder, this being advantageous in that the transport holder first remains on the motor vehicle front end, i.e., the assembler need only bring the headlamp into the assembly position thereof, without the potentially disruptive transport holder. Then, preferably, a first locking element is unlocked, making it possible for the headlamp to be easily released from the transport holder.

It is also advantageous for the headlamp, after release from the front end, to be moved past an auto body element into the assembly position thereof. The auto body element is designed so as to cover a portion of the headlamp as viewed from the front in the longitudinal direction of the motor vehicle. Analogously to the motor vehicle front end according to the present invention, the method according to the present invention is also particularly advantageous precisely for auto body elements designed in this manner, which entail, in particular, fenders.

The method according to the present invention also provides that after the headlamp has been brought into the assembly position thereof, the transport holder is released from the motor vehicle front end. Preferably, this releasing of the transport holder from the front end happens when the headlamp has been fastened in the assembly position thereof. The transport holder may then be released from the front end, for example, by unlocking of a second locking element, without the already-fastened headlamp being affected thereby.

BRIEF DESCRIPTION OF THE DRAWINGS

The present invention shall be described in greater detail hereinbelow, schematically with reference to FIGS. 1-9.

DETAILED DESCRIPTION OF PREFERRED EMBODIMENTS

For better visual clarity, the illustrated example of the front end in FIGS. 1-4 depicts only a part of the mounting bracket, i.e., the essential structural member 1 bearing the different installation components. The structural member 1 comprises receiving elements 2 for the connection of the transport holder 3 to the front end, this connection advantageously being a positive-locking connection in the example illustrated. To connect the headlamp 9 to the transport holder 3, the transport holder 3 advantageously comprises a first locking element 6, which can advantageously be operated with a first operating element 4a, 4b. The first operating element is depicted in the locked (4a) and unlocked (4b) state, respectively, of the first locking element 6.

The exemplary transport holder 3 further advantageously comprises a second locking element 7 for the connection to the front end. This second locking element is preferably operated by the second operating element 5a, 5b. The second operating element is also depicted in the locked (5a), and unlocked (5b) state, respectively, of the second locking element 7.

Figure 1:
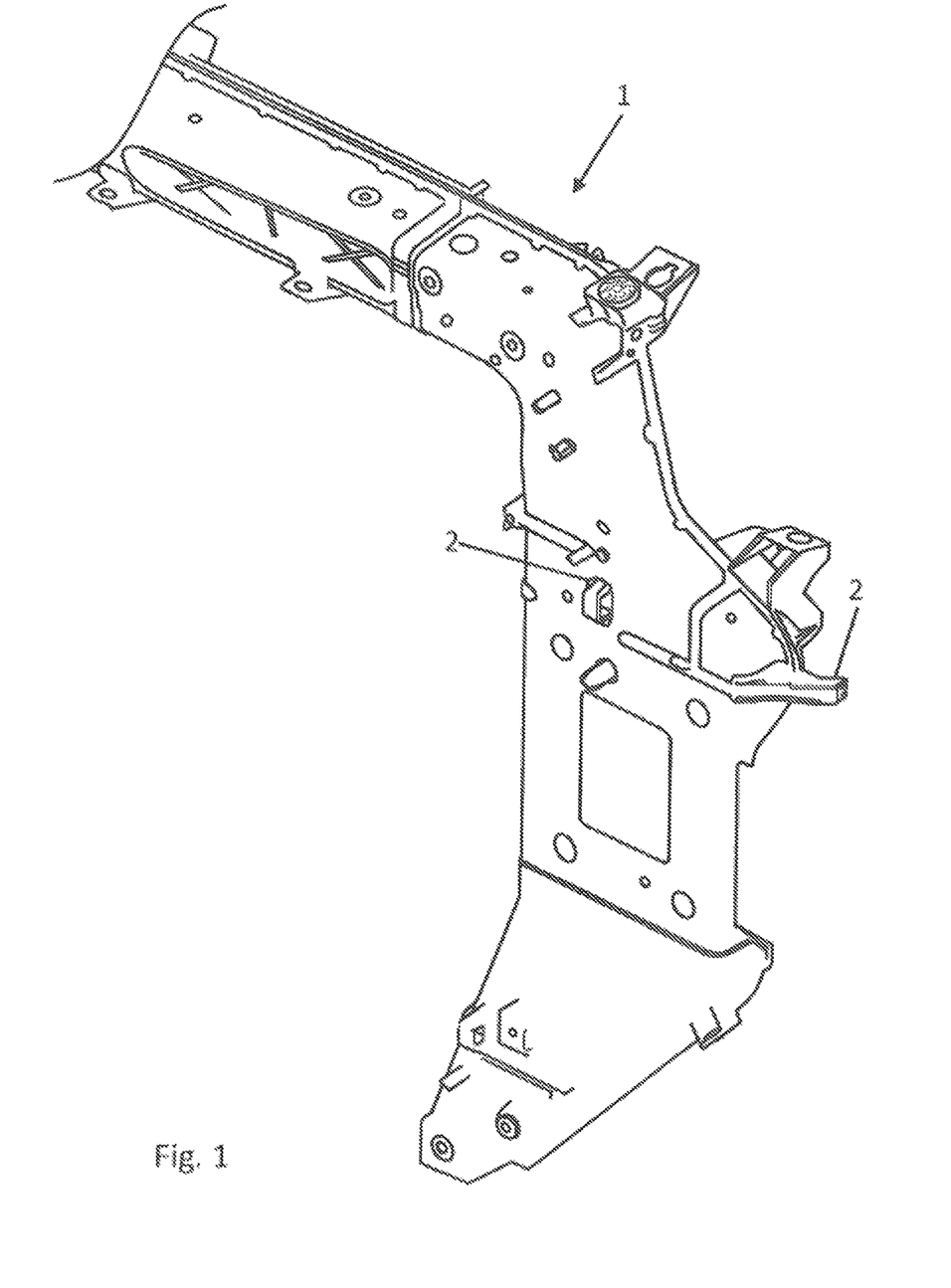
FIG. 1 illustrates a depiction of a structural member, namely, a mounting bracket of an exemplary front end according to the present invention.
Figure 2:
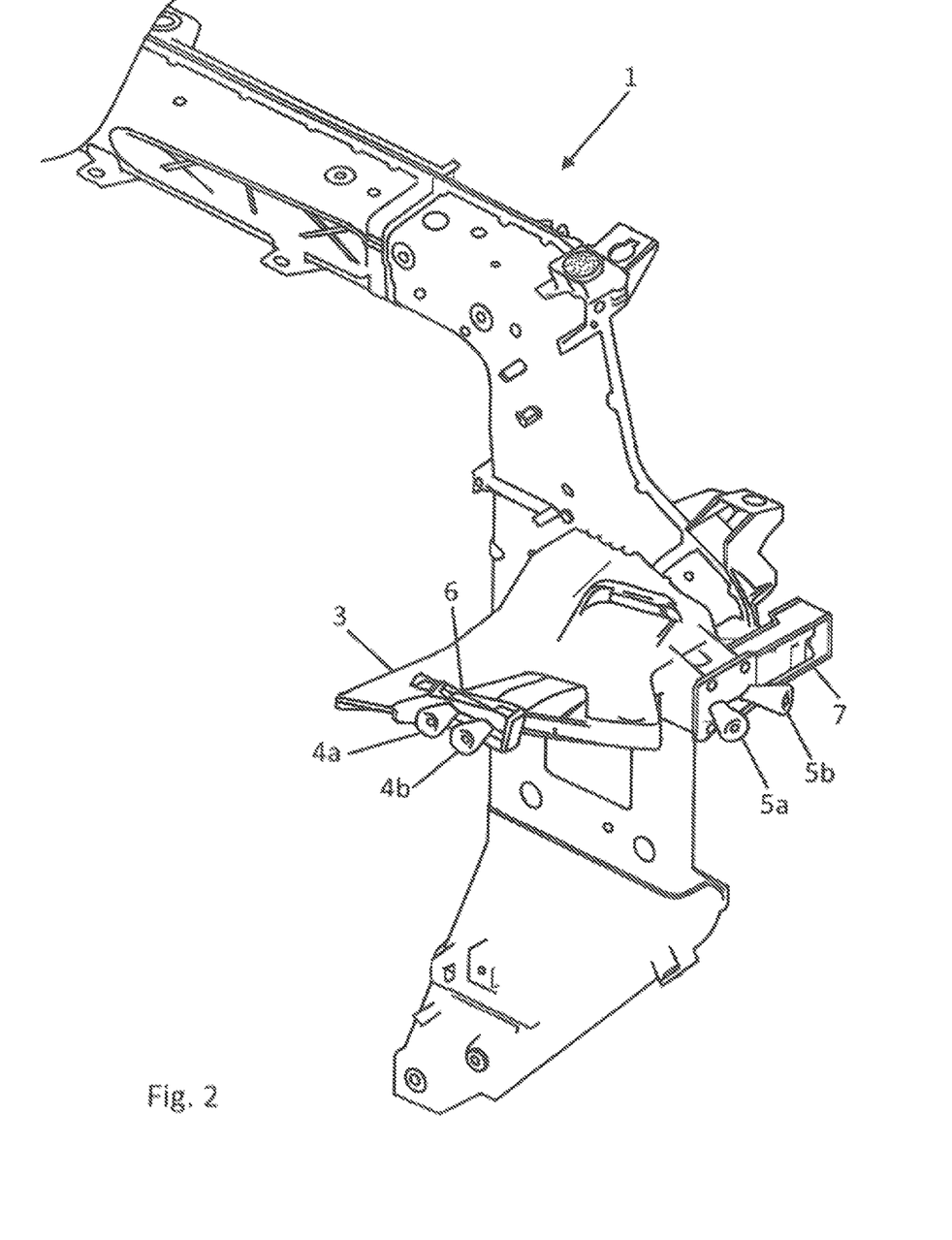
FIG. 2 illustrates the structural member from FIG. 1, with a transport holder accommodated thereon.
Figure 3:
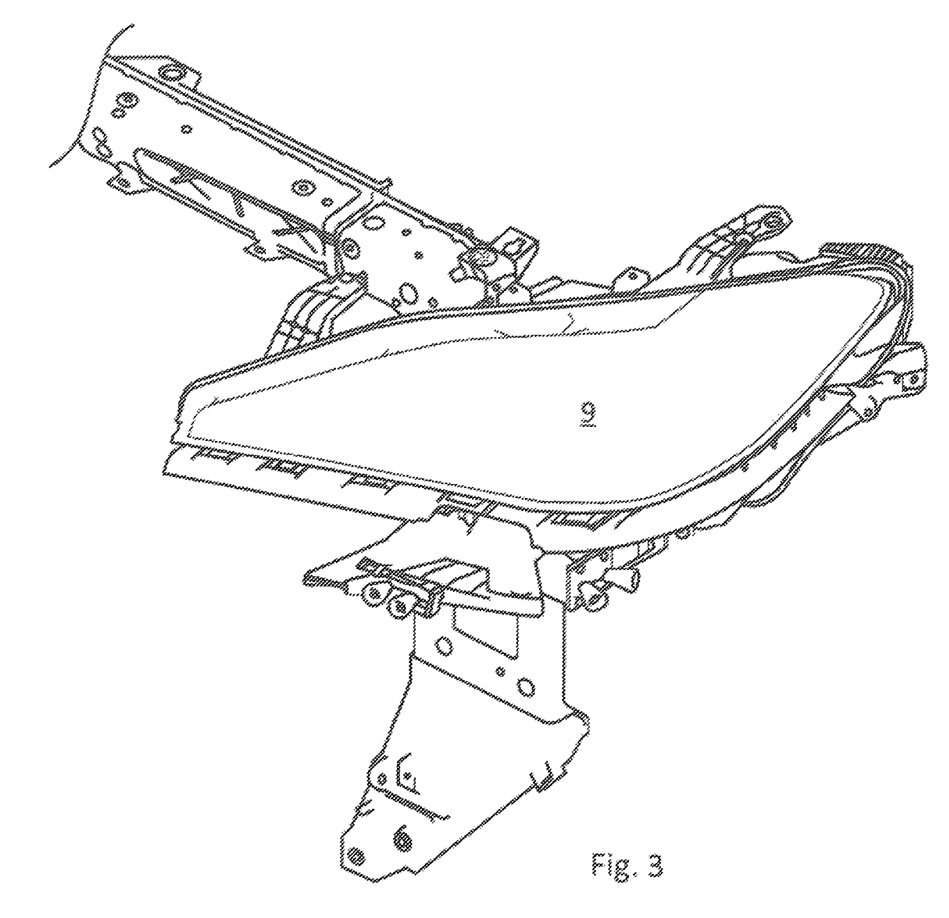
FIG. 3 illustrates the arrangement from FIG. 2, with a headlamp accommodated in the assembly position thereof.
Figure 4:
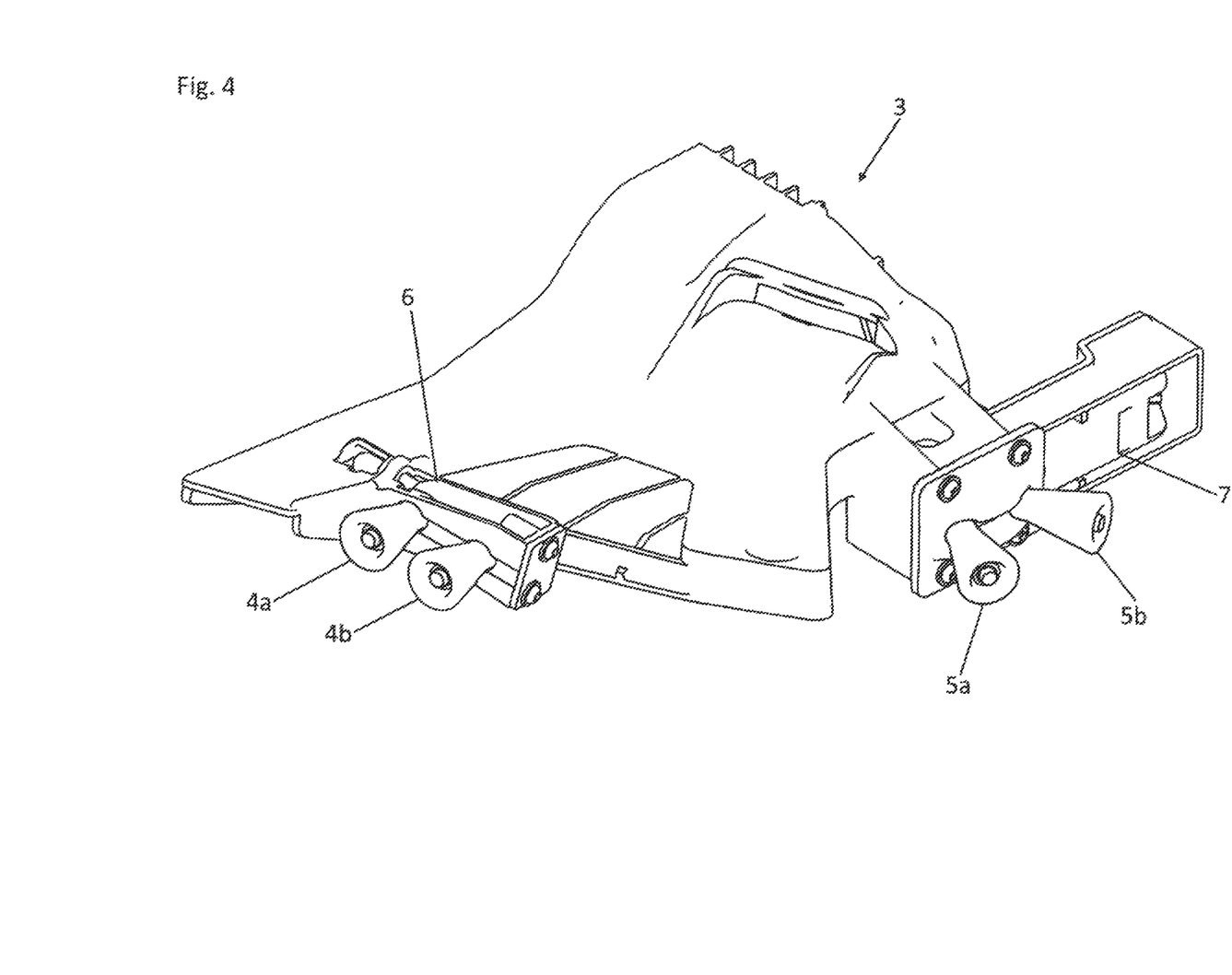
FIG. 4 illustrates a detailed depiction of the transport holder from FIGS. 2 and 3.
Figure 5:
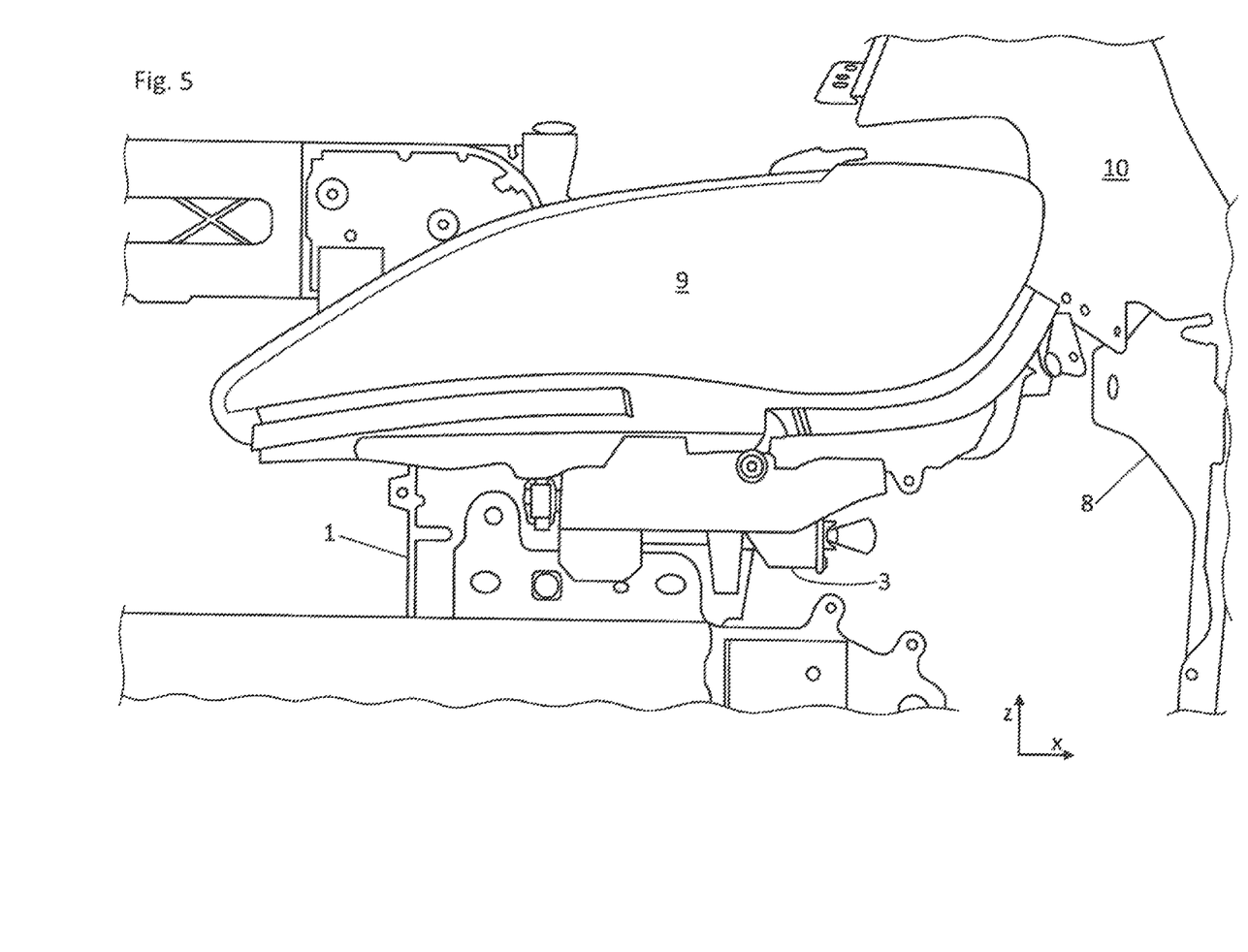
FIGS. 5-9 schematically illustrate individual method steps in the assembly of the front end according to a method according to the present invention.
Figure 6:
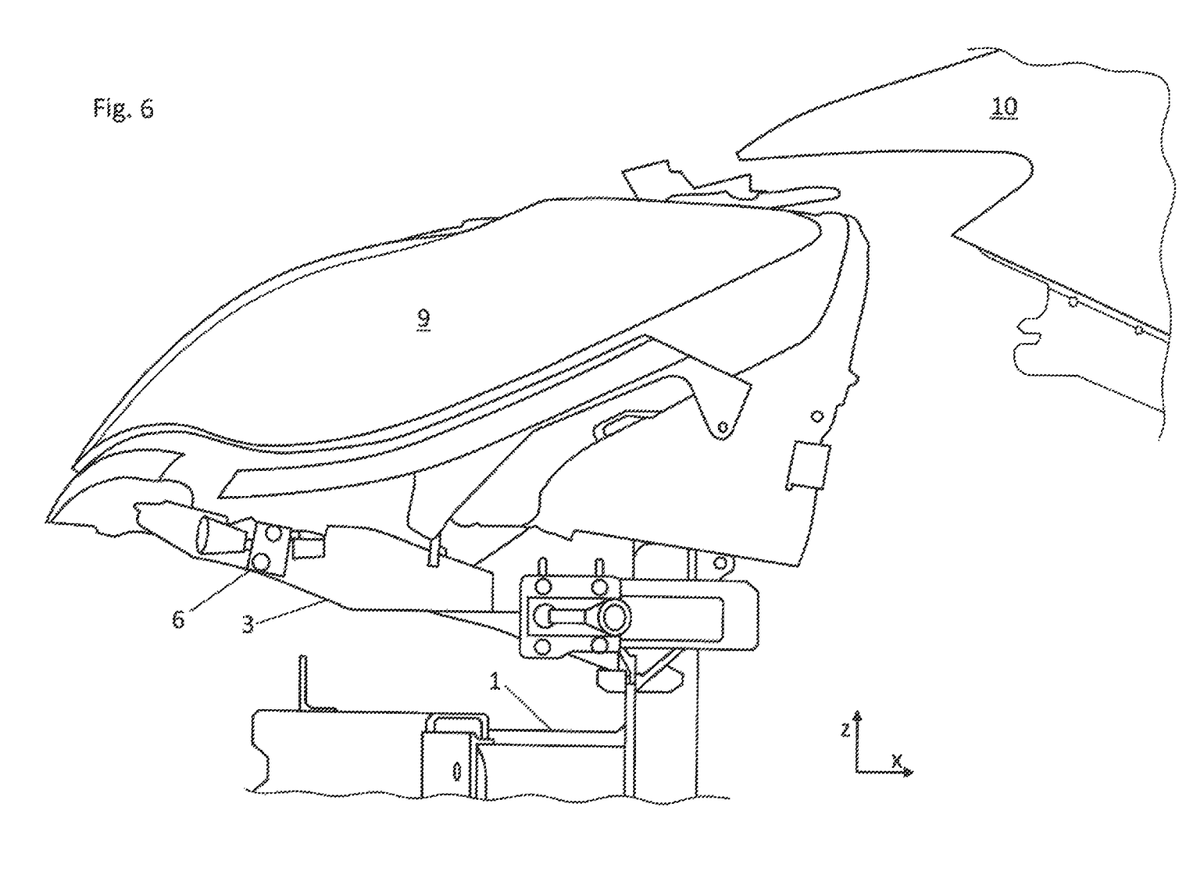

FIG. 5 illustrates the situation of assembly of the front end according to an exemplary method according to the present invention immediately after the front end has been fastened onto the motor vehicle. The structural member 1 is already firmly connected to the auto body of the motor vehicle. The headlamp 9 is still firmly connected to the structural member 1 by the transport holder 3. As can be seen in FIGS. 5 and 6, which depict the same point in time in the method but from a different direction, the headlamp is located in a position spaced apart from an auto body element 10. As can be seen in FIG. 5, were the headlamp 9 to be moved from this transport position in a rectilinear motion along the longitudinal direction Y of the vehicle in the direction of the assembly position thereof, then the headlamp would collide with the auto body element 10. Thanks to the method according to the present invention, however, the headlamp is located in the transport position thereof, which is offset frontward and downward relative to the assembly position.

Figure 7:
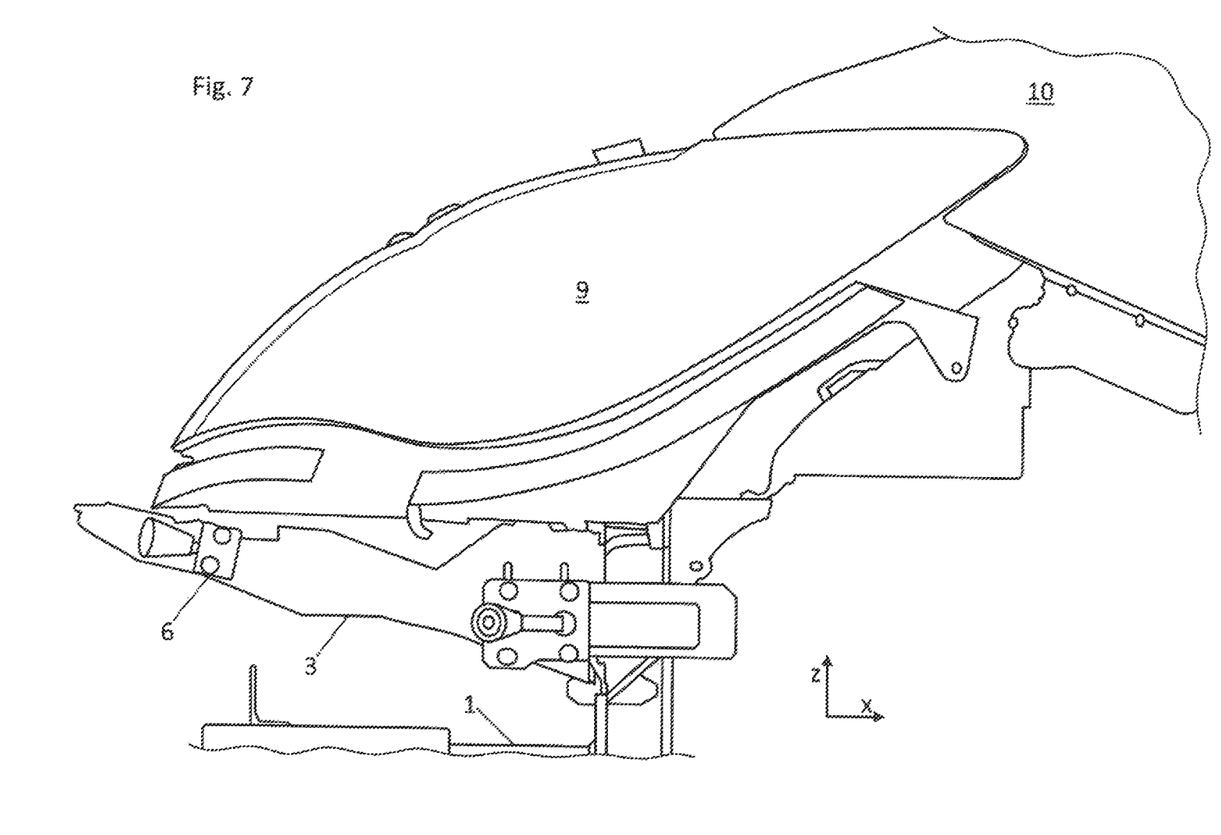
Figure 8:
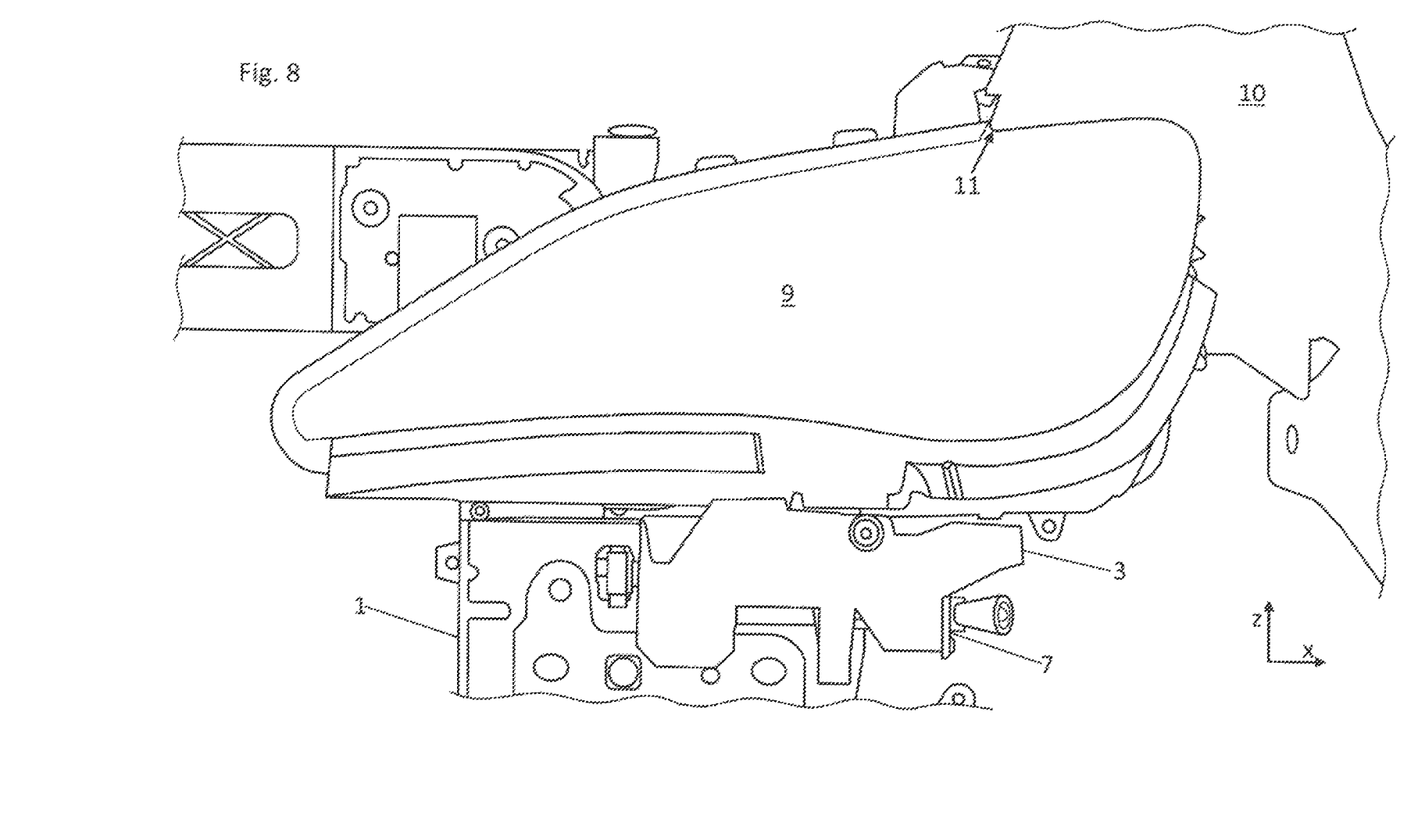
Figure 9:
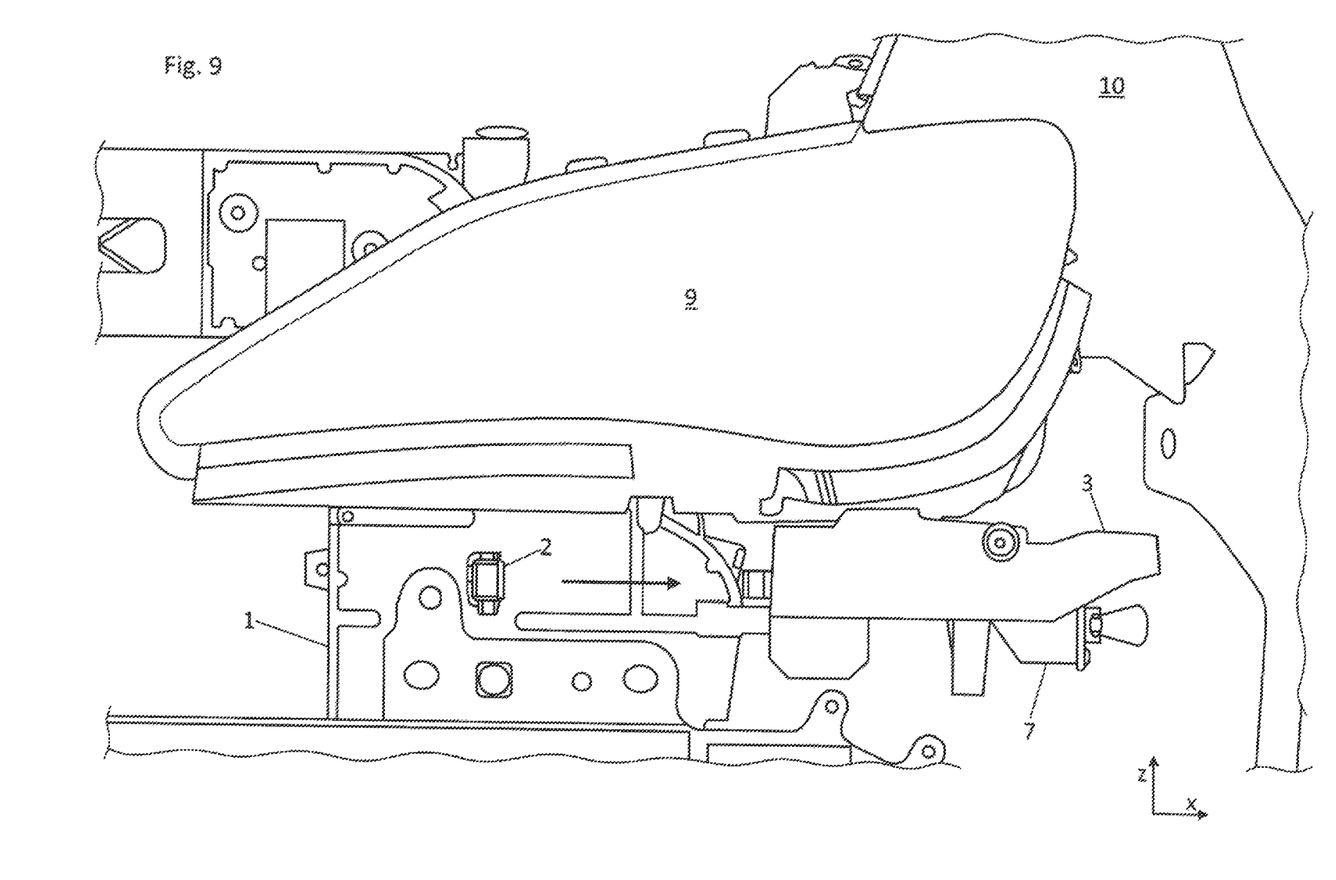

After the first locking element 6 is unlocked and the connection of the headlamp 9 to the transport holder 3 is thereby released, the headlamp 9 can now be manually brought into the assembly position thereof depicted in FIGS. 7 and 8. As can be seen, in particular, in FIG. 8, the headlamp 9 is also covered therein by a part of the auto body element 10, so that the headlamp must be guided past this coverage area 11 during the manual assembly.

In the example depicted, when the headlamp 9 is fastened in the assembly position thereof, the second locking element 7 is unlocked. The transport holder 3 can then—in the example illustrated—be advantageously released and removed from the structural member 1 in the width direction X of the motor vehicle. The transport holder 3 can now be returned to a first production facility and reused there.

LIST OF REFERENCE SIGNS

1 Structural member
2 Receiving element
3 Transport holder
4a First operating element, locked
4b First operating element, unlocked
5a Second operating element, locked
5b Second operating element, unlocked
6 First locking element
7 Second locking element
8 Auto body
9 Headlamp
10 Auto body element
11 Coverage area
X Width direction
Y Longitudinal direction
Z Height direction

What is claimed is:

1. A system for fastening at least one headlamp onto a motor vehicle front end, the system comprising:
   a) the at least one headlamp;
   b) the motor vehicle front end; and
   c) a transport holder, wherein:
   the at least one headlamp is movable from a transport position to an assembly position;
   the at least one headlamp is fastened by means of the transport holder onto the front end in the transport position for transporting the front end during assembly of the motor vehicle;
   the at least one headlamp is fastened to the front end in the assembly position after assembly of the motor vehicle;
   the transport position is different from the assembly position; and
   the transport holder is not active in maintaining the assembly position of the at least one headlamp.

2. The motor vehicle front end according to claim 1, wherein the transport position is at least one of offset frontward or offset downward relative to the assembly position.

3. The motor vehicle front end according to claim 2, wherein the transport holder has a first locking element for producing a releasable positive-locking connection of the transport holder to the at least one headlamp.

4. The motor vehicle front end according to claim 3, wherein the transport holder has a second locking element for producing a releasable positive-locking connection of the transport holder to the motor vehicle front end.

5. The motor vehicle front end according to claim 1, wherein the transport holder has a first locking element for producing a releasable positive-locking connection of the transport holder to the at least one headlamp.

6. The motor vehicle front end according to claim 5, wherein the transport holder has a second locking element for producing a releasable positive-locking connection of the transport holder to the motor vehicle front end.

7. A motor vehicle comprising the motor vehicle front end according to any one of claims 1-4, wherein the motor vehicle further comprises an auto body fender configured to cover a portion of the at least one headlamp, after assembly of the motor vehicle, as viewed from the front end in a longitudinal direction of the motor vehicle.

8. A method for assembling a motor vehicle, comprising the steps of:
   fastening a motor vehicle headlamp onto a motor vehicle front end at a first production facility with a transport holder, the transport holder holding the headlamp in a transport position, and then;
   transporting the motor vehicle front end to a second production facility, at which the motor vehicle front end is assembled onto a motor vehicle, and then;
   moving the headlamp from the transport position into an assembly position, and then;
   removing the transport holder from the motor vehicle front end and transporting the transport holder back to the first production facility to be reused there.

9. The method according to claim 8, wherein, when the motor vehicle front end is being assembled onto the motor vehicle, first fastening the motor vehicle front end onto the motor vehicle, and then releasing the headlamp from the motor vehicle front end, and fastening the headlamp onto the motor vehicle in the assembly position.

10. The method according to claim 9, wherein, when releasing the headlamp from the motor vehicle front end, first releasing the headlamp from the transport holder, wherein a first locking element is unlocked.

11. The method according to claim 10, wherein, after releasing the headlamp from the motor vehicle front end, moving the headlamp into the assembly position past an auto body element fender that covers a portion of the headlamp as viewed from the motor vehicle front end in a longitudinal direction of the motor vehicle.

12. The method according to claim 11, wherein, after moving the headlamp to the assembly position, releasing the transport holder from the motor vehicle front end, wherein a second locking element is unlocked.

13. The method according to claim 10, wherein, after moving the headlamp to the assembly position, releasing the transport holder from the motor vehicle front end, wherein a second locking element is unlocked.

14. The method according to claim 9, wherein, after releasing the headlamp from the motor vehicle front end, moving the headlamp into the assembly position past an auto body element fender that covers a portion of the headlamp as viewed from the motor vehicle front end in a longitudinal direction of the motor vehicle.

15. The method according to claim 14, wherein, after moving the headlamp to the assembly position, releasing the transport holder from the motor vehicle front end, wherein a second locking element is unlocked.

16. The method according to claim 9, wherein, after moving the headlamp to the assembly position, releasing the transport holder from the motor vehicle front end, wherein a second locking element is unlocked.

* * * * *